(12) United States Patent
Ono

(10) Patent No.: US 11,623,807 B2
(45) Date of Patent: Apr. 11, 2023

(54) POURING SPOUT

(71) Applicant: FUJIMORI KOGYO CO., LTD., Bunkyo-ku (JP)

(72) Inventor: Matsutaro Ono, Shinjuku-ku (JP)

(73) Assignee: FUJIMORI KOGYO CO., LTD., Bunkyo-ku (JP)

( * ) Notice: Subject to any disclaimer, the term of this patent is extended or adjusted under 35 U.S.C. 154(b) by 0 days.

(21) Appl. No.: 17/289,942

(22) PCT Filed: Oct. 24, 2019

(86) PCT No.: PCT/JP2019/041728
§ 371 (c)(1),
(2) Date: Apr. 29, 2021

(87) PCT Pub. No.: WO2020/090620
PCT Pub. Date: May 7, 2020

(65) Prior Publication Data
US 2022/0009688 A1     Jan. 13, 2022

(30) Foreign Application Priority Data

Oct. 30, 2018    (JP) .............................. JP2018-203604

(51) Int. Cl.
*B65D 75/58*      (2006.01)
*B65D 47/08*      (2006.01)

(52) U.S. Cl.
CPC ....... *B65D 75/5883* (2013.01); *B65D 47/089* (2013.01); *B65D 2575/586* (2013.01)

(58) Field of Classification Search
CPC ... B65B 3/0025; B65B 3/0032; B65B 3/0035; B65B 3/06; B65D 47/08;
(Continued)

(56) References Cited

U.S. PATENT DOCUMENTS 5,823,383 A * 10/1998 Hins ................. B29C 66/30223
                                                              215/44
6,126,045 A * 10/2000 Last ....................... B65D 41/02
                                                              222/499
(Continued)

FOREIGN PATENT DOCUMENTS

JP       2004099082 A   *   4/2004
JP       2004-231217 A     8/2004
(Continued)

OTHER PUBLICATIONS

JP2011173615A_MT; Machine translation into english of JP 2011173615 obtained on Jun. 18, 2022 from https://worldwide.espacenet.com/.*

(Continued)

*Primary Examiner* — Paul R Durand
*Assistant Examiner* — Randall A Gruby
(74) *Attorney, Agent, or Firm* — Oblon, McClelland, Maier & Neustadt, L.L.P.

(57) ABSTRACT

To provide a pouring spout that allows a nozzle of a packaging container to be accurately inserted into a pouring spout of a refill container. The above-described problem is solved by a pouring spout (10) provided to a refill container (1) for pouring contents into a packaging container, and for pouring out the contents stored in the refill container (1). The pouring spout (10) comprises at least a bonded part (11) bonded to a pouch main body part of the refill container, a tubular part (12) for pouring out the contents, a flange part (13) jutting outward at a boundary between the bonded part (11) and the tubular part (12), a channel (14) for passing the contents from an inside to an outside of the refill container, and a closing member (20) for opening and closing the channel (14). Both end portions of the flange part (13) separated farthest in a horizontal direction jut slightly out- (Continued)

(A)

(B)

ward from an area facing a peripheral wall part of the pouring unit constituting the packaging container.

19 Claims, 9 Drawing Sheets

(58) Field of Classification Search
CPC ....... B65D 47/0804–0852; B65D 75/58–5883; B65D 31/14; B65D 31/142; B65D 31/145
See application file for complete search history.

(56) References Cited

U.S. PATENT DOCUMENTS

| | | | |
|---|---|---|---|
| 6,612,466 B1* | 9/2003 | Malin | B29C 66/112 |
| | | | 222/572 |
| 6,644,519 B2* | 11/2003 | Last | B65D 47/36 |
| | | | 141/351 |
| 8,528,758 B2* | 9/2013 | Morlot | B65D 75/5883 |
| | | | 383/906 |
| 8,672,182 B2* | 3/2014 | Bonet Pedrol | B65D 75/5883 |
| | | | 222/107 |
| 9,132,944 B2* | 9/2015 | Schick | B29C 66/234 |
| 9,617,054 B2* | 4/2017 | Niggemyer | B65D 75/5883 |
| 10,442,582 B1* | 10/2019 | Ekkert | B65D 25/42 |
| 10,486,880 B2* | 11/2019 | Franca | B29C 66/112 |
| 10,669,076 B2* | 6/2020 | Van Der Molen | B65D 41/34 |
| 10,710,753 B2* | 7/2020 | Tamarindo | B65B 61/186 |
| 10,961,025 B2* | 3/2021 | Ono | B65D 47/08 |
| 11,155,390 B2* | 10/2021 | Ono | B65D 47/06 |
| 11,414,248 B2* | 8/2022 | Krajewski | B65D 47/2031 |
| 11,518,597 B2* | 12/2022 | Bloedt | B67D 3/0061 |
| 2003/0029138 A1* | 2/2003 | Kobetsky | B29C 66/232 |
| | | | 53/133.2 |
| 2004/0245286 A1* | 12/2004 | Lee | B65D 75/5883 |
| | | | 222/83 |
| 2006/0144875 A1* | 7/2006 | Etesse | B05B 11/047 |
| | | | 222/494 |
| 2012/0024858 A1* | 2/2012 | Sholes | B65D 75/5883 |
| | | | 220/367.1 |
| 2013/0319970 A1* | 12/2013 | Sugawara | B65D 47/10 |
| | | | 215/373 |
| 2017/0291054 A1* | 10/2017 | Compo | B65D 31/145 |
| 2018/0265259 A1* | 9/2018 | Berge | B65D 33/01 |
| 2019/0291933 A1* | 9/2019 | Nunez | B32B 7/12 |
| 2020/0062463 A1* | 2/2020 | Ono | B65D 75/5883 |
| 2020/0062464 A1* | 2/2020 | Ono | B05C 17/00513 |
| 2020/0095033 A1* | 3/2020 | Ono | B65D 47/2018 |
| 2020/0255203 A1* | 8/2020 | Roemer | B65D 75/5883 |
| 2022/0002038 A1* | 1/2022 | Ono | B65D 47/0885 |
| 2022/0332488 A1* | 10/2022 | Guerin | B65D 75/5883 |

FOREIGN PATENT DOCUMENTS

| | | | |
|---|---|---|---|
| JP | 2011-131922 A | | 7/2011 |
| JP | 2011-173615 A | | 9/2011 |
| JP | 2011173615 | * | 9/2011 |
| JP | 2011213397 | * | 10/2011 |
| JP | 2018-95258 A | | 6/2018 |
| WO | WO 2018/105686 A1 | | 6/2018 |

OTHER PUBLICATIONS

JP2011213397A_MT; Machine translation into english of JP 2011213397 obtained on Jun. 18, 2022 from https://worldwide.espacenet.com/.*
International Search Report and Written Opinion dated Jan. 21, 2020 in PCT/JP2019/041728, 7 pages.
Extended European Search report dated Jun. 7, 2022, in European Patent Application No. 19878440.7 (7 pages).

* cited by examiner

POURING SPOUT

CROSS REFERENCE TO RELATED APPLICATIONS

This application is a National Stage of International Application No. PCT/JP2019/041728, filed Oct. 24, 2019, and claims priority to Japanese Application No. 2018-203604, filed Oct. 30, 2018. The entire disclosures of all of the above applications are incorporated herein by reference.

FIELD OF THE INVENTION

The present invention relates to a pouring spout, and more specifically to a pouring spout of a refill container characterized by a form of a flange part.

BACKGROUND ART

Conventionally, there is a refill container for replenishing or filling a packaging container with contents. A pouring spout for pouring out the contents is attached to such a refill container. There are various forms of pouring spouts, such as a form in which a flange part is provided at a base end portion of a spout having a tubular shape and a form in which the flange part is not provided.

For example, the pouring spout proposed in Patent Document 1 is provided with a flange part at a base end portion of a spout having a tubular shape. This pouring spout is proposed to facilitate, when a spout of a flexible pouch turned upside down is fit to a mouth part of a container for repeated use, the pressing of the spout downward by fingertips holding a portion of the spout, enabling a smooth open operation of the above-described closing plate of the spout. To obtain such an effect, in the pouring spout proposed in the same document, the flange part between a pouch inner tubular part and a pouch outer tubular part of the spout is provided with an extending part that outwardly extends end portions opposite to each other in an overlapping direction of a pouch packaging material of the flexible pouch, allowing fingers to be placed on one surface on the pouch inner tubular part side.

PRIOR ART DOCUMENTS

Patent Documents

Patent Document 1: Japanese Laid-Open Patent Application No. 2015-13655

SUMMARY OF THE INVENTION

Problems to be Solved by the Invention

In the pouring spout proposed in Patent Document 1, the flange part juts significantly outward from a center side of the pouring spout. Therefore, when the flange part is pressed by fingertips, the fingertip of one hand may press the immediate vicinity of the spout, and the fingertip of the other hand may press the vicinity of an outer peripheral portion of the flange part. In this case, the refill container tilts, and the nozzle of the packaging container cannot be accurately inserted into the pouring spout of the refill container. As a result, the contents of the refill container may spill out.

The present invention was made to solve the above-described problems, and an object of the present invention is to provide a pouring spout that allows a nozzle of a packaging container to be accurately inserted into a pouring spout of a refill container.

Means for Solving the Problems

A pouring spout according to the present invention for solving the above-described problems is a pouring spout provided to a refill container for pouring contents into a packaging container, and for pouring out the contents stored in the refill container. The pouring spout comprises at least a bonded part bonded to a pouch main body part constituting the refill container, a tubular part for pouring out the contents, a flange part jutting outward at a boundary portion between the bonded part and the tubular part, a channel for passing the contents from an inside to an outside of the refill container, and a closing member for opening and closing the channel. The packaging container includes a container main body and a pouring unit for pouring out the contents stored in the container main body. The pouring unit includes a nozzle for pouring out the contents and a peripheral wall part surrounding the nozzle. Both end portions of the flange part separated farthest in a horizontal direction jut slightly outward from an area facing the peripheral wall part.

According to this invention, both end portions of the flange part separated farthest in the horizontal direction jut slightly outward from an area facing the peripheral wall part, and thus positions of fingers placed on both sides of the tubular part from a center are the same or substantially the same. This makes it possible to make forces of pressing the pouring spout with the fingers placed on both sides of the tubular part the same or substantially the same. Even if the forces of pressing the pouring spout with the fingers placed on both sides of the tubular part differ, the vicinity of the tubular part is pressed, making it possible to suppress the tilting of the refill container. Therefore, it is possible to accurately insert the nozzle of the packaging container into the channel of the pouring spout, and pour the contents of the refill container into the packaging container without spilling.

In the pouring spout according to the present invention, the bonded part is formed tapering from a center of the bonded part in one direction of two orthogonal directions toward both sides in the one direction, and has an arcuate outer shape projecting outward in the other direction.

According to this invention, the bonded part is formed tapering from the center of the bonded part in one direction of two orthogonal directions toward both sides in the one direction, and has an arcuate outer shape projecting outward in the other direction, making it possible to secure the channel of the pouring spout in an area in which the pouring spout and the pouch main body part are bonded together. This makes it possible to smoothly transfer contents from the refill container into the packaging container.

In the pouring spout according to the present invention, an outer shape of the flange part is circular, elliptical, polygonal, or a combination thereof.

According to this invention, the outer shape of the flange part is circular, elliptical, polygonal, or a combination thereof, making it possible to select a flange part having a design corresponding to an individual refill container.

In the pouring spout according to the present invention, the flange part includes an arcuate part having an arcuate shape around the tubular part and jutting outward, and a jutting part jutting outward in the one direction, the jutting part being formed with a dimension in the other direction smaller than a diameter of the tubular part.

According to this invention, the pouring spout includes the jutting part jutting outward in the one direction of the two directions mentioned above, the jutting part being formed with a dimension in the other direction smaller than a diameter of the tubular part, thereby limiting the positions of the flange part where the fingers are placed. As a result, when the flange part is pressed and the nozzle of the packaging container is inserted into the channel, it is possible to maintain a posture of the refill container, suppress tilting, and insert the nozzle more accurately.

Effect of the Invention

According to the present invention, it is possible to provide a pouring spout that allows a nozzle of a packaging container to be accurately inserted into a pouring spout of a refill container.

EMBODIMENTS OF THE INVENTION

An embodiment of the present invention is described below with reference to the drawings. The present invention includes inventions of the same technical idea as the modes set forth in the embodiments and drawings described below, and the technical scope of the present invention is not limited to those described in the embodiments and drawings.

[Basic Configuration]

Figure 2:
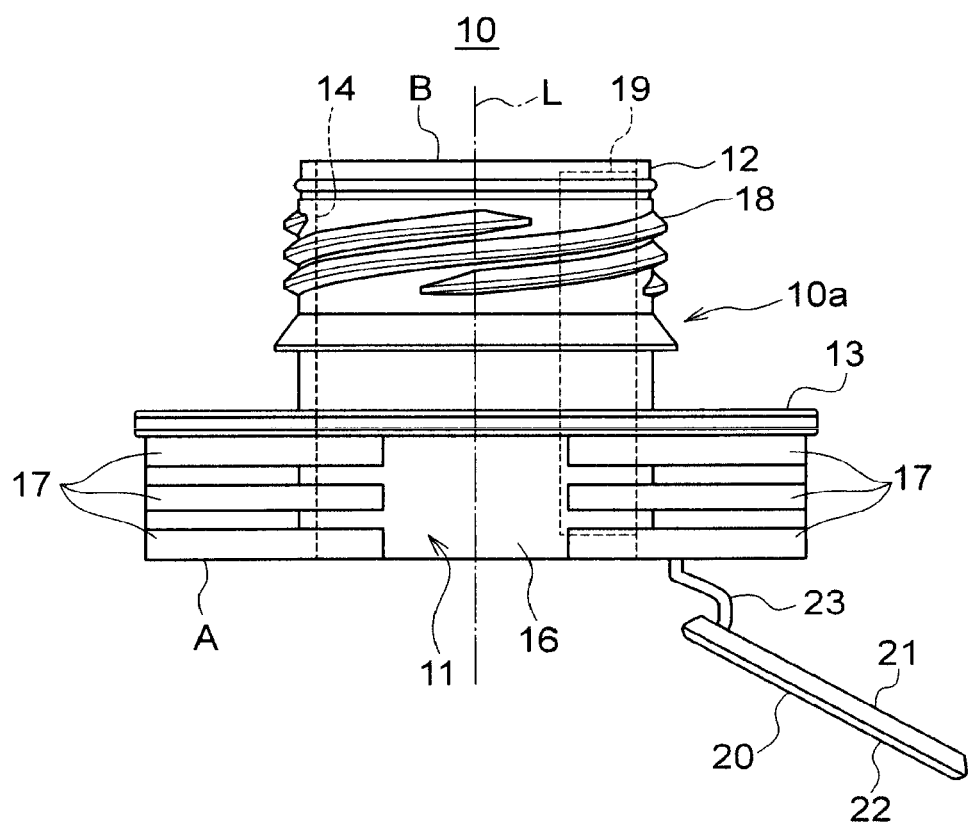
FIG. 2 is a side view of the pouring spout according to the present invention as viewed from a side.

A pouring spout 10 according to the present invention is the pouring spout 10 provided to a refill container 1 for pouring contents into a packaging container 30, and for pouring out the contents stored in the refill container 1. The pouring spout 10, as illustrated in FIG. 2, includes at least a bonded part 11, a tubular part 12, a flange part 13, a channel 14, and a closing member 20, for example. The bonded part 11 is an area bonded to a pouch main body part 5 constituting the refill container 1. The tubular part 12 is an area for pouring the contents. The flange part 13 is an area that juts outward at a boundary portion between the bonded part 11 and the tubular part 12. The channel 14 is an area for passing the contents from an inside to an outside of the refill container 1. Then, the closing member 20 is a component for opening and closing the channel 14.

On the other hand, the packaging container 30 includes a container main body 31 and a pouring unit 40 for pouring the contents stored in the container main body 31. The pouring unit 40 includes a nozzle 43 for pouring the contents and a peripheral wall part 42 surrounding the nozzle 43. Then, both end portions of the flange part 13 separated farthest in a horizontal direction jut slightly outward from an area facing the peripheral wall part 42.

"Jut slightly outward" means not projecting significantly from the area facing the peripheral wall part 42. Specifically, both end portions of the flange part 13 separated farthest in the horizontal direction are positioned outward within a range of 3 mm to 15 mm (jutting amount on one side) from an area facing the peripheral wall part 42.

According to the pouring spout 10 according to the present invention, a distinctive effect of making it possible to provide the pouring spout 10 that allows the nozzle 43 of the packaging container 30 to be accurately inserted into the pouring spout 10 of the refill container 1, and the flange to be efficiently pressed to open the closing member is exhibited.

The following describes an overview of the refill container 1 provided with the pouring spout 10, a specific configuration of the pouring spout 10, an overview of the packaging container 30 used by being replenished with contents stored in the refill container 1, and the action of the pouring spout 10.

[Refill Container Provided with Pouring Spout]

Figure 1:
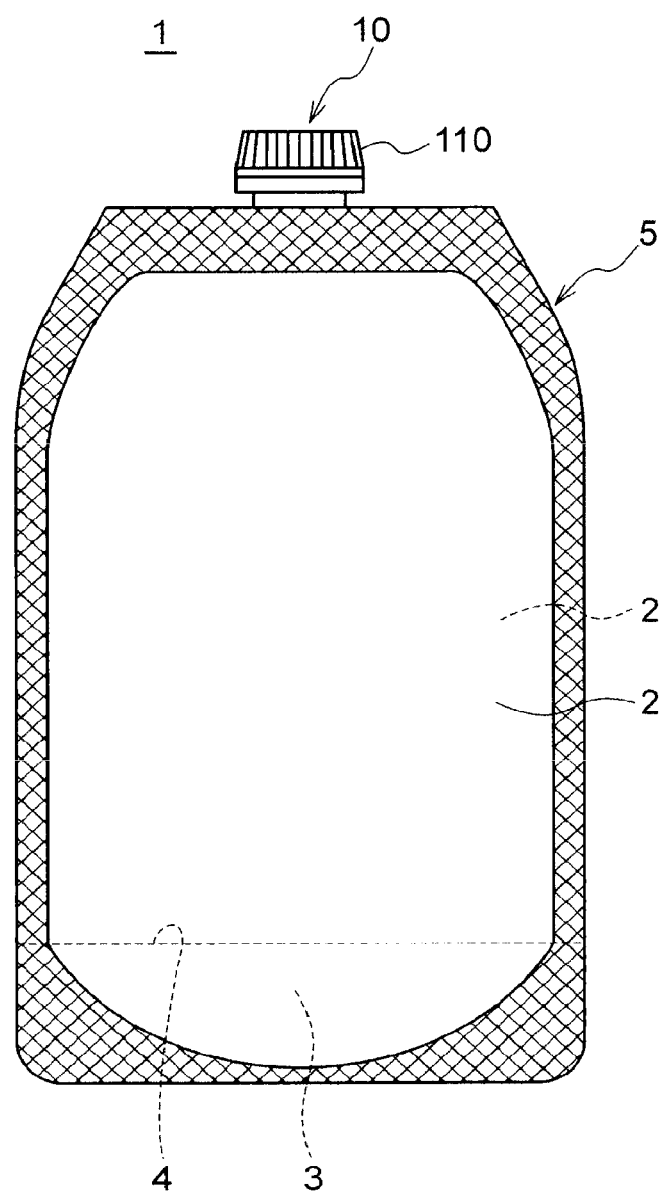
FIG. 1 is a plan view of a refilling container provided with a pouring spout according to the present invention.

The refill container 1 provided with the pouring spout 10 according to the present invention is mainly used as a container for replenishing the packaging container 30 used separately from the refill container 1 with contents. The forms and types of the refill container 1 are not particularly limited. FIG. 1 illustrates a standing pouch serving as an example of the refill container 1. This refill container 1 includes a pair of flat surface parts 2 facing each other, a bottom surface part 3 that closes a bottom portion of the refill container 1, and the pouring spout 10 according to the present invention.

The flat surface parts 2 are sealed together at an upper edge, and sealed together at both side edges. Lower edges of the pair of flat surface parts 2 are each sealed at an edge portion of the bottom surface part 3 facing the lower edge of the flat surface part 2. The bottom surface part 3 is folded in half at a crease 4 at a center thereof, and the crease 4 is folded toward an upper side of the refill container 1. The bottom surface part 3 is configured to allow a bottom portion of the refill container 1 to be unfolded by the unfolding of the bottom surface part 3 from the folded state in directions in which the flat surface parts 2 of the refill container 1 are disposed.

The pouring spout 10 according to the present invention is attached to an upper edge of the refill container 1. The pouring spout 10 is constituted by a spout main body 10a and a cap 110 that opens and closes the tubular part 12 of the pouring spout 10. Note that, in the present embodiment, a case in which the pouring spout 10 is attached to a center of an upper portion of the refill container 1 is given as an example. However, while not particularly illustrated in the drawings, the pouring spout 10 may be provided in a position shifted to a side part in a width direction in the upper portion of the refill container 1. Further, the refill container 1 may be provided with an area communicated by an inclined part where an upper edge and a side edge are obliquely inclined, and the pouring spout 10 may be attached to the inclined part.

The refill container 1 is used as a container for transferring the contents into the packaging container 30 (refer to FIG. 6) prepared separately from this refill container 1. When the contents are transferred into the packaging container 30, the cap 110 that closes the pouring spout 10 is removed, and the refill container 1 is turned upside down. Then, the pouring spout 10 is pierced into the pouring unit 40 of the packaging container 30, and the contents are transferred directly from the refill container 1 into the packaging container 30. Note that this action is described in detail later.

First Embodiment of Pouring Spout

Figure 3A:
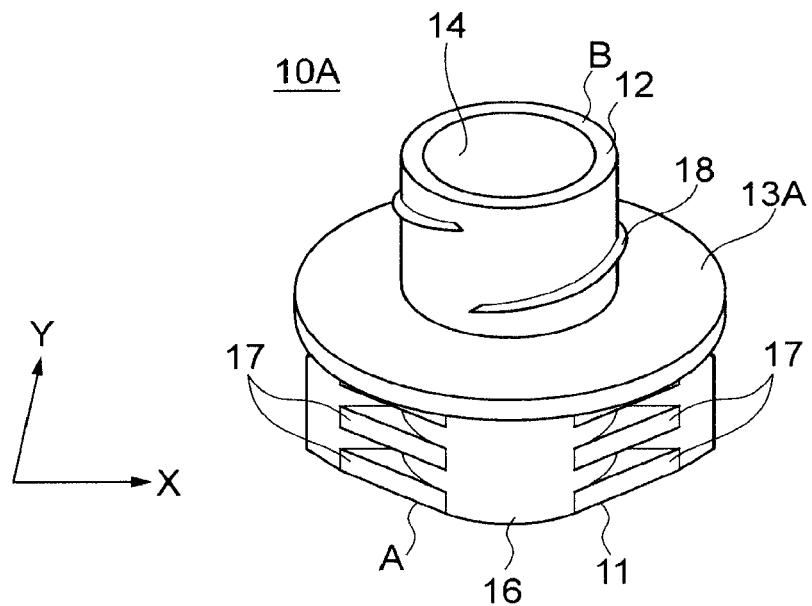
FIGS. 3A and 3B are drawings illustrating a pouring spout of a first embodiment, FIG. 3A being a perspective view and FIG. 3B being a plan view.
Figure 3B:
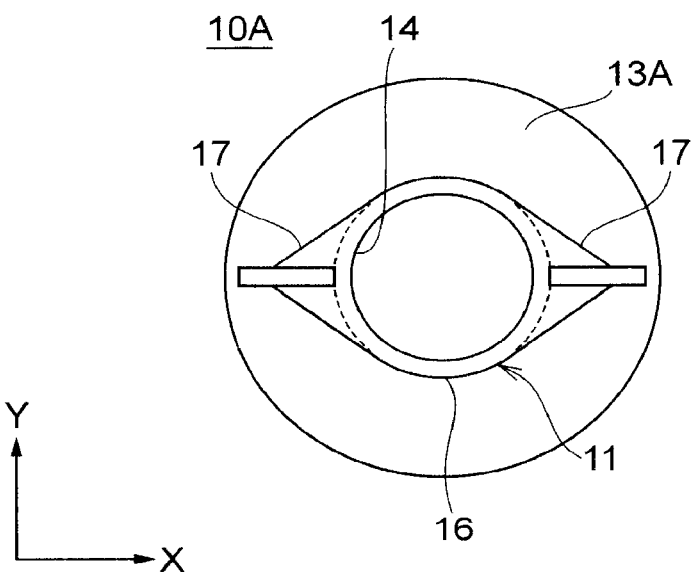

In the pouring spout 10 of the first embodiment, as illustrated in FIGS. 3A and 3B, an outer diameter of a flange part 13A is formed into a circular shape. The pouring spout 10 is constituted by the tubular part 12, the flange part 13A, the bonded part 11, and the closing member 20. The channel 14 is formed in an inside of the tubular part 12 and the bonded part 11, and is configured so that the contents can be poured through the channel 14 to the outside.

The tubular part 12 is formed into a cylindrical shape and has a function of pouring the contents of the refill container 1 to the outside. As mentioned above, the channel 14 is formed on an inner side of the tubular part 12 in a mode extending in an axial direction L. On the other hand, a thread part 18 is formed on an outer peripheral surface of the tubular part 12. The thread part 18 is an area into which the cap 110 is screwed by being engaged with threads inside the cap 110 for closing the tubular part 12. A guide 19 is formed in the channel 14 inside the tubular part 12. The guide 19 is a constituting part for guiding the nozzle in the axial direction L by being fit into a slit formed in the nozzle 43 of the pouring unit 40.

The bonded part 11 is an area bonded to the pouch main body part 5 of the refill container 1, and has a boat-like outer shape. That is, both side surfaces of the bonded part 11, at a central portion in an X direction, which is one direction of two directions orthogonal to each other, include a jutting part 16 that juts in a semicircular shape in a Y direction, which is the other direction, both end portions in the X direction taper toward both end sides, and both side surfaces are connected at both end portions in the X direction. A plurality of protruding parts 17 extending in the X direction are formed on each side surface part of the jutting part 16. The protruding part 17 projects outward from an outer peripheral surface of the tubular part 12 and extends to the vicinity of an outer peripheral edge of the flange part 13A. An area between the protruding parts 17 is a space. This protruding part 17 is a constituting part for facilitating the bonding of the pouring spout 10 to the pouch main body part 5.

The closing member 20 is a component for opening and closing the channel 14, and has a disk shape. The closing member 20 closes the channel 14 by being fit onto an inner side of the channel 14 on a first surface 21 on one end A side of the tubular part 12 in the axial direction L, that is, on the bonded part 11 side. On the other hand, the closing member 20 that closes the channel 14 is configured to be removed from the channel 14 by an external force applied from a second surface on the other end B side opposite to the first surface 21 on the one end A side of the tubular part 12 in the axial direction L, toward the one end A side. Therefore, a diameter of the closing member 20 is formed to the same size as or slightly smaller than an inner diameter of the channel 14. Such a closing member 20 is connected to the spout main body 10a by a coupling member 23. The coupling member 23 is constituted by a resin, and has a long, narrow string or belt shape.

The flange part 13A is an area utilized when the nozzle 43 of the pouring unit 40 constituting the packaging container 30 is inserted into the channel 14 of the pouring spout 10 and the refill container 1 is pressed into the packaging container 30 with fingers placed thereon. The flange part 13A of the first embodiment has a circular outer shape. With the outer shape of the flange part 13A being circular, the flange part 13A is configured so that the flange part 13A can be pressed with fingers placed at any position as long as on both sides of the flange part 13A with the tubular part 12 interposed therebetween. Note that the flange part 13A is not limited to having a circular shape, and may be formed into an elliptical shape. When the flange part 13A is formed into an elliptical shape, a long axis direction matches the X direction, and a short axis direction matches the Y direction.

Second Embodiment of Pouring Spout

Figure 4A:
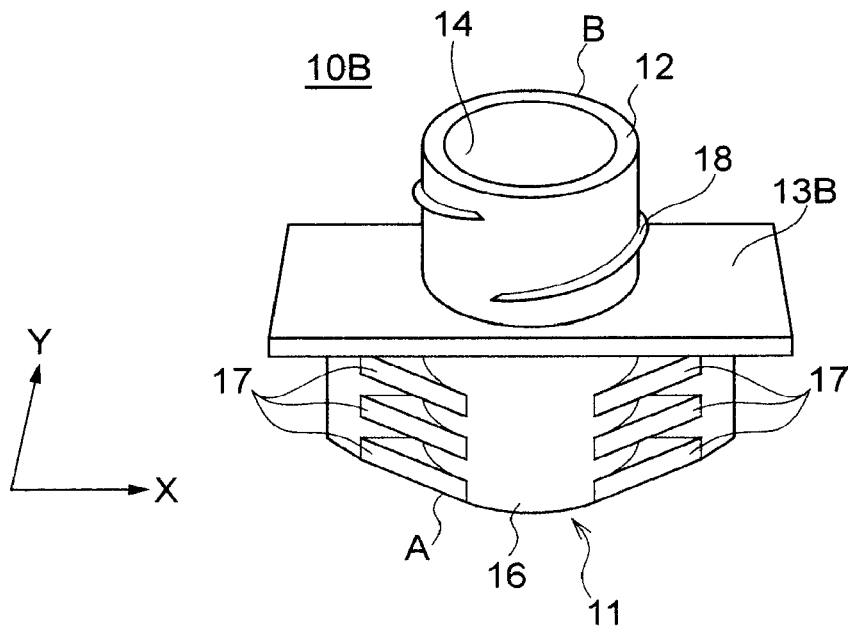
FIGS. 4A and 4B are drawings illustrating a pouring spout of a second embodiment, FIG. 4A being a perspective view and FIG. 4B being a plan view.
Figure 4B:
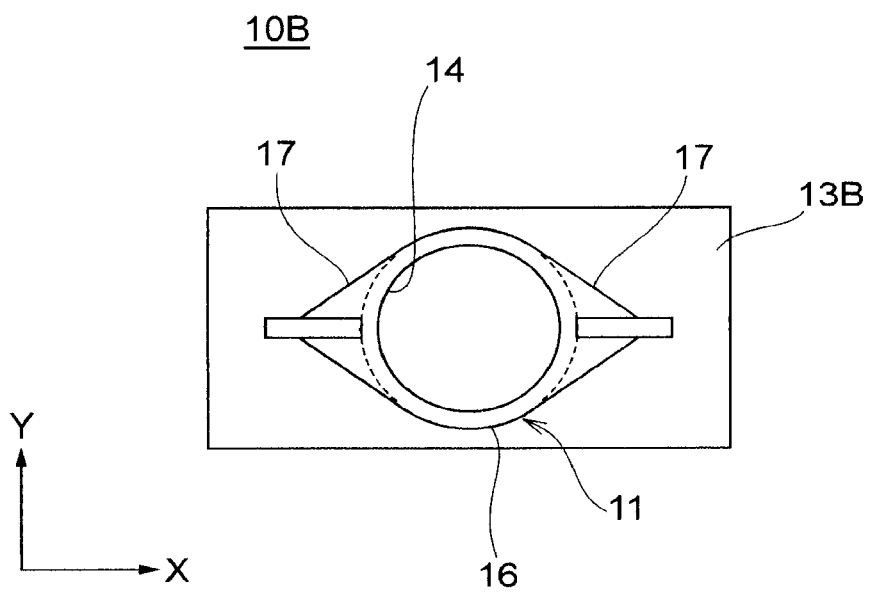

In the pouring spout 10 of a second embodiment, as illustrated in FIGS. 4A and 4B, an outer diameter of a flange part 13B is formed into a square shape. The pouring spout 10 is constituted by the tubular part 12, the flange part 13B, the bonded part 11, and the closing member 20. The channel 14 is formed in an inside of the tubular part 12 and the bonded part 11, and is configured so that the contents can be poured through the channel 14 to the outside. Note that the configuration of the pouring spout 10 of the second embodiment is the same as the configuration of the pouring spout 10 of the first embodiment except that the shape of the flange part 13B is different, and thus descriptions of configurations other than the configuration of the flange part 13B will be omitted.

The flange part 13B of the second embodiment has a polygonal outer shape. In the example illustrated in FIGS. 4A and 4B, the outer shape of the flange part 13B is formed into a rectangular shape. A long axis direction of the flange part 13B matches the X direction, and a short axis direction of the flange part 13B matches the Y direction. The flange part 13B having a rectangular shape and illustrated in FIGS. 4A and 4B is configured so that the flange part 13B can be pressed with fingers placed on both sides of the flange part 13B with the tubular part 12 interposed therebetween in the X direction. The outer shape of the flange part 13B of the second embodiment is not limited to being rectangular as long as the shape is a polygon, such as a triangle, a square, a pentagon, a hexagon, or an octagon. The outer shape of the flange part 13B can be freely formed in accordance with a function, a design, and the like of the refill container 1.

Third Embodiment of Pouring Spout

Figure 5A:
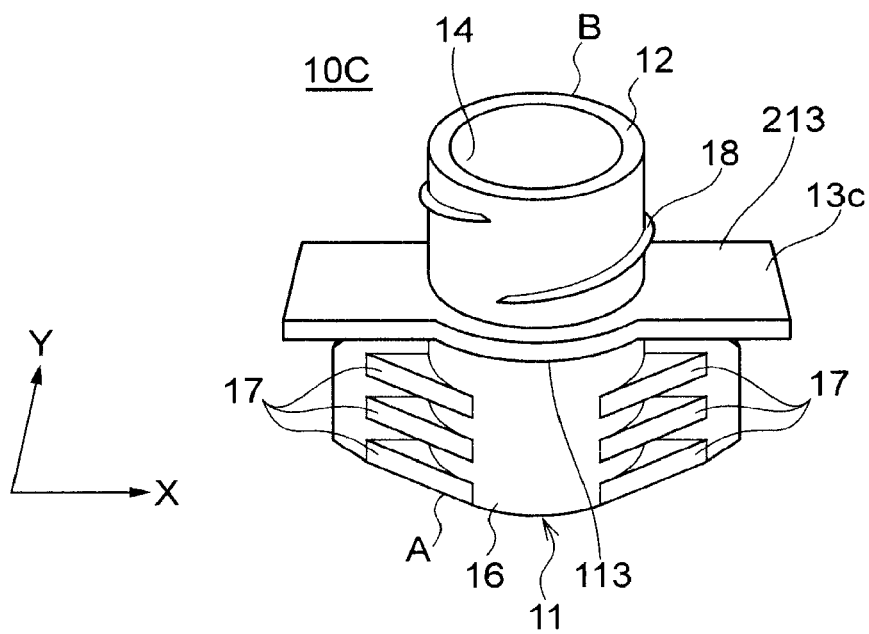
FIGS. 5A and 5B are drawings illustrating a pouring spout of a third embodiment, FIG. 5A being a perspective view and FIG. 5B being a plan view.
Figure 5B:
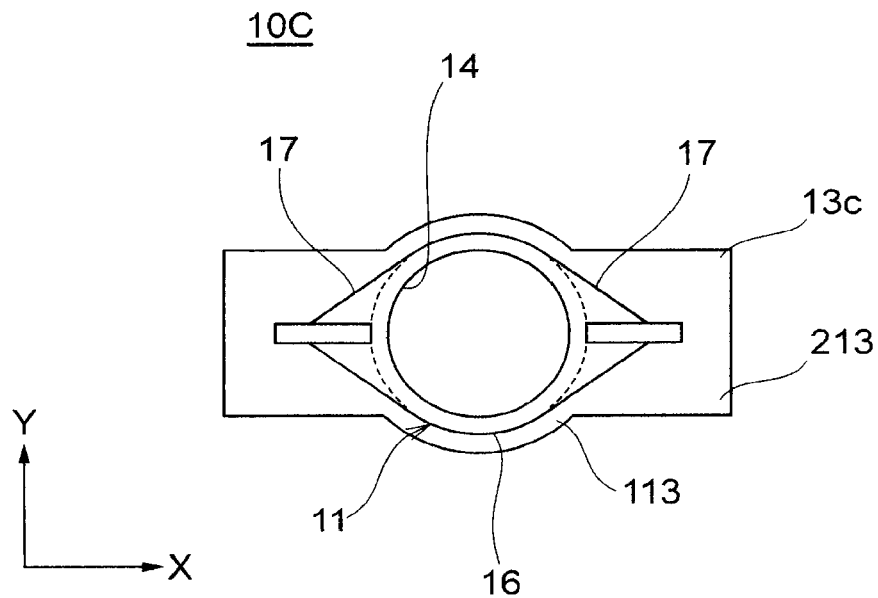

As illustrated in FIG. 5, a flange part 13C of a third embodiment includes an arcuate part 113 having an arcuate shape around the tubular part 12 and jutting outward, and a rectangular part 213 jutting outward in the X direction, which is the one direction. Then, the rectangular part 213 is formed with a dimension in the Y direction, which is the other direction, smaller than a diameter of the tubular part 12. The arcuate part 113 juts outward in an arcuate shape so as to surround both sides of the tubular part 12 in the Y direction. On the other hand, the rectangular part 213 has a rectangular outer shape and juts outward from the tubular part 12 in the X direction. As illustrated in FIG. 5B, a width, that is, a dimension in the Y direction, of the rectangular part 213, is formed smaller than the diameter of the tubular part 12.

In the pouring spout 10 of the third embodiment, the flange part 13C has a small area compared to those of the pouring spout 10 of the first embodiment and the pouring spout 10 of the second embodiment, and is formed only in a region closer to the tubular part 12. Therefore, the positions where fingers are placed are limited to positions close to the tubular part 12. As a result, even in a case in which the force of pressing with a finger placed on one side of the tubular part 12 and the force of pressing with a finger placed on the other side in the X direction differs when the refill container 1 is pressed toward the pouring unit 40 of the packaging container 30, it is possible to suppress the tilting of the refill container 1 to the utmost, and insert the nozzle 43 of the pouring unit 40 included in the packaging container 30 into the channel 14.

The pouring spout 10 described in the first embodiment, the second embodiment, and the third embodiment is formed using a resin such as polyethylene, polypropylene, polyester, ethylene-vinyl copolymer, and polyvinyl chloride. However, the material of the pouring spout 10 is not limited as long as the pouring spout is moldable. Further, examples of applicable raw materials of the resin include petroleum-derived, plant-derived, copolymers thereof, blends thereof, and the like.

[Packaging Container]

Figure 6:
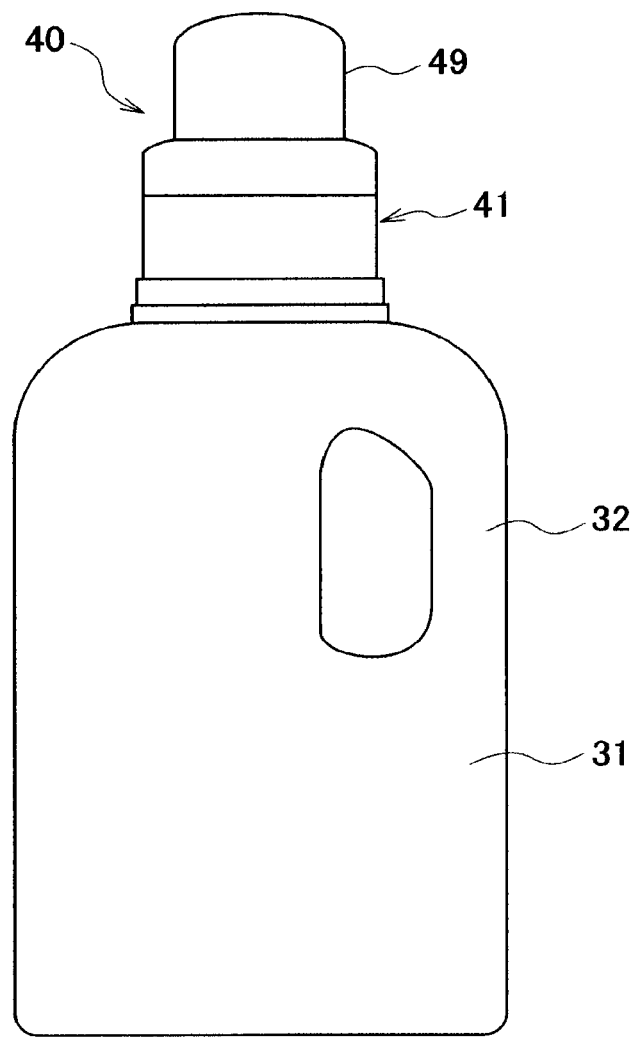
FIG. 6 is a side view illustrating a packaging container to be replenished with contents from the refilling container.

The packaging container 30 is a container used by being replenished with contents stored in the refill container 1. The packaging container 30 is constituted by a resin or the like, for example. FIG. 6 illustrates an example of the packaging container 30. The packaging container 30 illustrated in FIG. 6 is constituted by the container main body 31 provided with a handle 32, and the pouring unit 40 for pouring out the contents stored in the container main body 31. This packaging container 30 is used by removing from the packaging container 30 the contents moved from the refill container 1 in an amount required when necessary.

Figure 7:
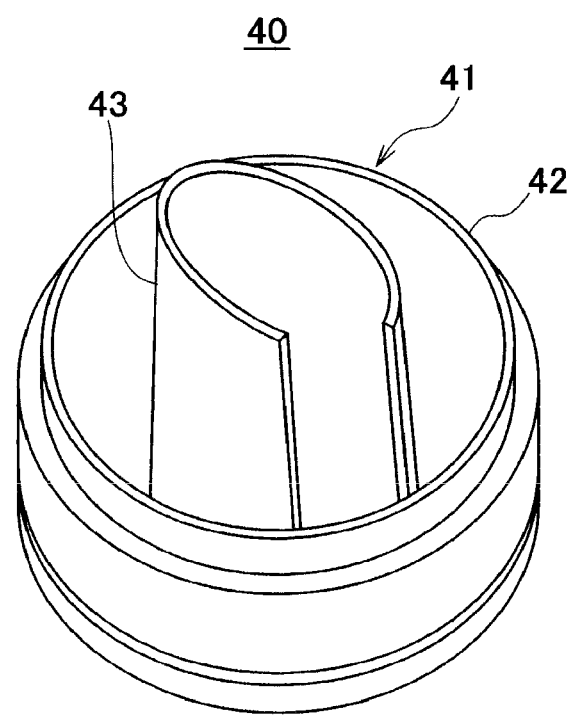
FIG. 7 is a perspective view of a pouring unit.

The pouring unit 40 of the packaging container 30 is constituted by a main body part 41, and a cap 49 for opening and closing the main body part 41. The main body part 41, as illustrated in FIG. 7, includes the peripheral wall part 42, and the nozzle 43 disposed on an inner side of this peripheral wall part 42. The peripheral wall part 42 has a tubular shape, and an inner side thereof is hollow.

The nozzle 43 is disposed in a central or substantially central position of the main body part 41. The nozzle 43 is connected to the peripheral wall part 42 and integrated with the peripheral wall part 42. A slit extending in the axial direction is formed in the nozzle 43, as illustrated in FIG. 7. Further, the nozzle 43 is configured to project from the main body part 41 toward an upper side, with a tip end thereof positioned on an upper side of the upper end of the peripheral wall part 42. Note that FIG. 7 illustrates one example of the shape of the nozzle 43, and the shape of the nozzle 43 is not particularly limited.

[Procedure for Replenishing Packaging Container with Contents and Action of Pouring Spout]

Figure 8:
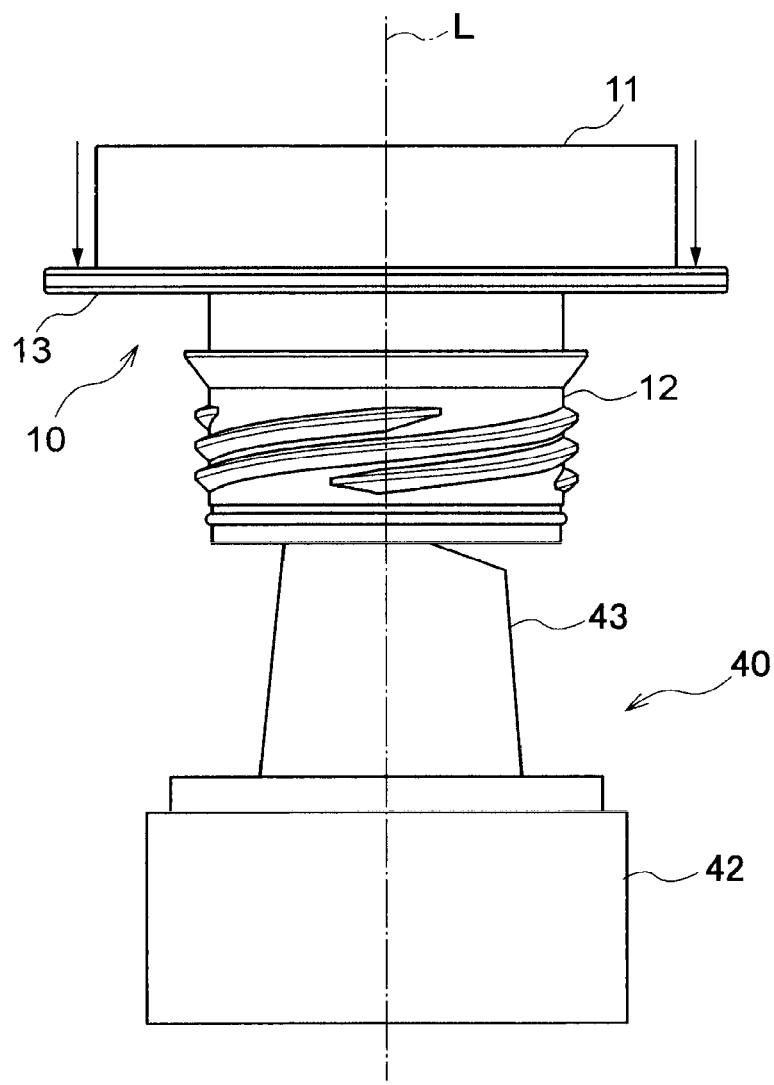
FIG. 8 is an explanatory view for explaining an action of pressing the pouring spout toward the pouring unit.
Figure 9:
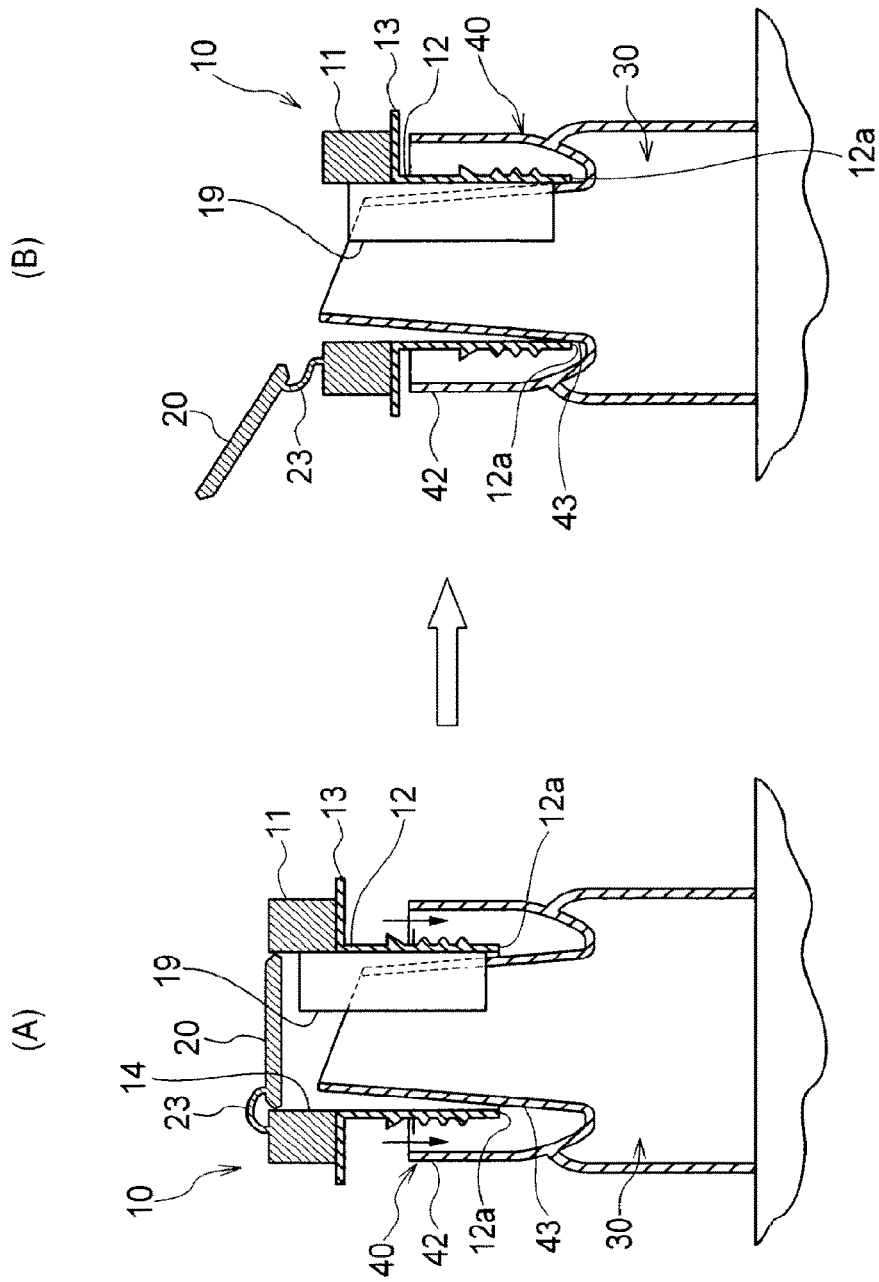
FIG. 9 is an explanatory view for explaining an action of inserting a nozzle into a channel of the pouring spout.

The procedure for replenishing the packaging container 30 with the contents stored in the refill container 1, and the action of the pouring spout 10 of the present embodiment will now be described with reference to FIG. 8 and FIGS. 9A and 9B. Note that FIG. 8 illustrates only the pouring spout 10 of the refill container 1 and the pouring unit 40 of the packaging container 30 and, to make the action of the pouring spout 10 easy to understand, FIG. 9 does not illustrate the refill container 1 and the container main body 31 of the packaging container 30. However, the pouring spout 10 is attached to the refill container 1 illustrated in FIG. 1, and the pouring unit 40 is the pouring unit 40 illustrated in FIG. 7 and provided to the packaging container 30 illustrated in FIG. 6.

First, as illustrated in FIG. 8, the cap 110 is removed from the pouring spout 10, the refill container 1 is turned upside down, and the pouring spout 10 is positioned on a lower side of the refill container 1. The channel 14 of the pouring spout 10 is closed by the closing member 20, and thus the contents stored in the refill container 1 never spill out.

Next, as illustrated in FIG. 8 and FIG. 9A, the pouring spout 10 is matched with the position of the pouring unit 40 of the packaging container 30 from which the cap 49 is removed, and the nozzle 43 of the pouring unit 40 is inserted into the channel 14 of the pouring spout 10. That is, the nozzle 43 of the pouring unit 40 is inserted into the channel 14 constituted on the inner side of the tubular part 12 constituting the pouring spout 10. At that time, as illustrated in FIG. 8, fingers are placed on the flange part 13 positioned on both sides of the tubular part 12, and the flange part 13 is pressed toward the pouring unit 40.

Next, with the nozzle 43 inserted into the tubular part 12, the pouring spout 10 is pressed further downward on the pouring unit 40 side. When the pouring spout 10 is pressed downward, the slit of the nozzle 43 sandwiches the guide 19 of the pouring spout 10, and the nozzle 43 is guided in the axial direction L. Then, the tip end of the nozzle 43 guided in the axial direction L presses the closing member 20 upward. As a result, as illustrated in FIG. 9B, the closing member 20 is removed from the channel 14 constituting the inner side of the tubular part 12. That is, the closing member 20 is removed from the inner peripheral surface of the tubular part 12 by an external force applied from the other end B side (tip end side of the cylindrical pouring part) opposite to the one end A side (end portion side provided with the bonded part 11) of the tubular part 12 in the axial direction L. At this time, the closing member 20 is configured as a separate body from the spout main body 10a, and is fit into the channel 14 constituting the tubular part 12, simply closing the channel 14, and thus is smoothly removed from the channel 14 without causing the closing member 20 itself to be damaged by the nozzle 43. Therefore, only the contents are moved into the packaging container 30 without producing broken pieces.

Further, as illustrated in FIG. 9B, the nozzle 43 is inserted into an inside of the tubular part 12 and, when the closing member 20 is removed from the spout main body 10a, a tip end portion of the tubular pouring body comes into contact with an outer peripheral surface of the nozzle 43. Therefore, the contents poured from the refill container 1 are moved to the packaging container 30 through the nozzle 43 without leaking to an outer side of the nozzle 43.

As described above, according to the present invention, the following effects can be exhibited: (1) the flange part 13 can be pressed with fingers placed at any position as long as on both sides of the flange part 13 with the tubular part 12 interposed therebetween, (2) the outer shape of the flange part 13 can be freely formed in accordance with the function, the design, and the like of the refill container 1, and (3) it is possible to suppress the tilting of the refill container 1 to the utmost, and insert the nozzle 43 of the pouring unit 40 included in the packaging container 30 into the channel 14. As a result, according to the present invention, it is possible to provide the pouring spout 10 that allows the nozzle 43 of the packaging container 30 to be accurately inserted into the pouring spout 10 of the refill container 1.

DESCRIPTIONS OF REFERENCE NUMERALS

1 Refill container
2 Flat surface part

3 Bottom surface part
4 Crease
5 Pouch main body part
10 Pouring spout
10a Spout main body
11 Bonded part
12 Tubular part
13, 13A, 13B, 13C Flange part
14 Channel
16 Jutting part
17 Protruding part
18 Thread part
19 Guide
20 Closing member
21 First surface
22 Second surface
23 Coupling member
30 Packaging container
31 Container main body
32 Handle
40 Pouring unit
41 Main body part
42 Peripheral wall part
43 Nozzle
49 Cap
110 Cap
113 Arcuate part
213 Rectangular part

What is claimed is:

1. A pouring spout configured to be attached to a refill container to pour out contents stored in the refill container into a packaging container, the pouring spout comprising:
 a bonded part configured to be bonded to a pouch main body part constituting the refill container;
 a tubular part for pouring out the contents stored in the refill container;
 a flange part jutting outward at a boundary portion between the bonded part and the tubular part; and
 a closing member for opening and closing a channel, the channel formed in the tubular part and the bonded part for passing the contents stored in the refill container from an inside to an outside of the refill container,
 wherein the packaging container comprises a container main body and a pouring unit, the pouring unit comprising a nozzle for pouring out contents stored in the container main body and a peripheral wall part surrounding the nozzle, and
 the flange part of the pouring spout is formed such that, when the nozzle of the packaging container is inserted into the channel of the pouring spout, each of end portions of the flange part separated farthest in a horizontal direction juts outward from the peripheral wall part of the pouring unit of the packaging container;
 wherein the tubular part has a guide formed in the channel inside the tubular part, the nozzle of the pouring unit of the packaging container has a slit, and the guide is formed to fit into the slit.

2. The pouring spout according to claim 1, wherein the bonded part tapers from a center of the bonded part toward both sides of the bonded part in a first direction, and projects outward to form an arcuate outer shape in a second direction orthogonal to the first direction.

3. The pouring spout according to claim 2, wherein the flange part has an outer shape which is circular, elliptical, polygonal, or a combination thereof.

4. The pouring spout according to claim 2, wherein the flange part has an outwardly jutting arcuate part having an arcuate shape around the tubular part, and a jutting part jutting outward in a first direction, and a dimension of the jutting part in a second direction orthogonal to the first direction is smaller than a diameter of the tubular part.

5. The pouring spout according to claim 2, wherein the tubular part has a thread part formed on an outer peripheral surface of the tubular part for screwing a cap.

6. The pouring spout according to claim 2, wherein the pouring spout comprises a resin.

7. The pouring spout according to claim 6, wherein the resin comprises at least one selected from the group consisting of polyethylene, polypropylene, polyester, ethylene-vinyl copolymer, and polyvinyl chloride.

8. The pouring spout according to claim 2, wherein the flange part of the pouring spout is formed in such a size that, when the nozzle of the packaging container is inserted into the channel of the pouring spout, each of end portions of the flange part separated farthest in the horizontal direction juts outward from the peripheral wall part of the pouring unit of the packaging container by 3 mm to 15 mm.

9. The pouring spout according to claim 1, wherein the flange part has an outer shape which is circular, elliptical, polygonal, or a combination thereof.

10. The pouring spout according to claim 9, wherein the tubular part has a thread part formed on an outer peripheral surface of the tubular part for screwing a cap.

11. The pouring spout according to claim 9, wherein the pouring spout comprises a resin.

12. The pouring spout according to claim 1, wherein the flange part has an arcuate part having an arcuate shape around the tubular part, and a jutting part jutting outward in a first direction, and a dimension of the jutting part in a second direction orthogonal to the first direction is smaller than a diameter of the tubular part.

13. The pouring spout according to claim 1, wherein the tubular part has a thread part formed on an outer peripheral surface of the tubular part for screwing a cap.

14. The pouring spout according to claim 1, wherein the pouring spout comprises a resin.

15. The pouring spout according to claim 14, wherein the resin comprises at least one selected from the group consisting of polyethylene, polypropylene, polyester, ethylene-vinyl copolymer, and polyvinyl chloride.

16. The pouring spout according to claim 1, wherein the closing member fits onto an inner side of the channel to close the channel, and is configured to be removed from the channel to open the channel by an external force applied by the nozzle of the packaging container inserted into the channel of the pouring spout.

17. The pouring spout according to claim 1, further comprising:
 a coupling member connecting the closing member to the bonded part.

18. The pouring spout according to claim 17, wherein the coupling member comprises a resin.

19. The pouring spout according to claim 1, wherein the flange part of the pouring spout is formed in such a size that, when the nozzle of the packaging container is inserted into the channel of the pouring spout, each of end portions of the flange part separated farthest in the horizontal direction juts outward from the peripheral wall part of the pouring unit of the packaging container by 3 mm to 15 mm.

* * * * *